United States Patent
Panta et al.

(10) Patent No.: US 9,288,752 B2
(45) Date of Patent: Mar. 15, 2016

(54) METHOD AND APPARATUS FOR REDUCING ENERGY CONSUMPTION OF RADIO COMMUNICATIONS IN A WIRELESS SENSOR NETWORK

(71) Applicant: AT&T Intellectual Property I, L.P., Atlanta, GA (US)

(72) Inventors: Rajesh Krishna Panta, Bridgewater, NJ (US); James Allan Pelletier, Bridgewater, NJ (US); Gregory T. Vesonder, Boonton Township, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 212 days.

(21) Appl. No.: 14/051,297

(22) Filed: Oct. 10, 2013

(65) Prior Publication Data
US 2015/0103707 A1   Apr. 16, 2015

(51) Int. Cl.
  H04W 4/00    (2009.01)
  H04W 52/02   (2009.01)
  H04W 74/08   (2009.01)

(52) U.S. Cl.
  CPC .......... H04W 52/0203 (2013.01); H04W 4/005 (2013.01); H04W 4/006 (2013.01); H04W 74/0808 (2013.01)

(58) Field of Classification Search
None
See application file for complete search history.

(56) References Cited

U.S. PATENT DOCUMENTS

| | | | |
|---|---|---|---|
| 7,230,991 B2 | 6/2007 | Sang et al. | |
| 7,295,513 B2 | 11/2007 | Elliott et al. | |
| 7,463,631 B2 | 12/2008 | Bao et al. | |
| 8,265,566 B2 | 9/2012 | Golitschek | |
| 8,401,018 B2 | 3/2013 | Meylan et al. | |
| 2004/0266451 A1 | 12/2004 | Stolyar et al. | |
| 2009/0116434 A1 | 5/2009 | Lohr et al. | |
| 2009/0154352 A1 | 6/2009 | Sun | |
| 2009/0201871 A1 | 8/2009 | Sambhwani et al. | |
| 2011/0176465 A1* | 7/2011 | Panta et al. | 370/311 |
| 2011/0205923 A1 | 8/2011 | Doll et al. | |
| 2012/0250649 A1 | 10/2012 | Goodwin et al. | |

OTHER PUBLICATIONS

Buettner et al., X-MAC—A Short Preamble MAC Protocol for Duty-Cycled Wireless Sensor Networks, SenSys '06, Nov. 1-3, 2006, Boulder, Colorado, USA.*

(Continued)

*Primary Examiner* — Hoon J Chung

(57) ABSTRACT

A method, a non-transitory computer-readable medium and an apparatus for receiving a data packet that is transmitted from a first sensor node are disclosed. For example, the method performs a channel scan of a particular burst of channel scans. When the preamble packet is detected, the method determines whether the preamble packet is addressed to the second sensor node. When the preamble packet is addressed to the second sensor node, the method sends an acknowledgement packet to the first sensor node. The method then receives the data packet that is transmitted from the first sensor node. The method then sleeps for a duration of time, when there is no packet transmission that is ongoing that is destined to the second sensor node.

20 Claims, 6 Drawing Sheets

(56) References Cited

OTHER PUBLICATIONS

Polastre et al., Versatile Low Power Media Access for Wireless Sensor Networks, SenSys '04, Nov. 3-5, 2004, Baltimore, Maryland, USA.*
Panta et al., Efficient Asynchronous Low Power Listening for Wireless Sensor Networks, 2012 31st International Symposium on Reliable Distributed Systems, Oct. 8-11, 2012.*
Ali et al., "Optimal and Approximate Mobility-Assisted Opportunistic Scheduling in Cellular Networks," *Mobile Computing, IEEE Transactions on*, 2007, col. 6, No. 6, pp. 633-648.

Piazza et al., "Multiuser Diversity-Mobility Tradeoff: Modeling and Performance Analysis of a Proportional Fair Scheduling," *Global Telecommunications Conference, 2002, GLOBECOM '02. IEEE*, 2002, vol. 1, pp. 906-910.

Shirani-Mehr et al., "Channel State Prediction, Feedback and Scheduling for a Multiuser MIMO-OFDM Downlink," *Signals, Systems, and Computers, 2008 42$^{nd}$ Asilomar Conference on*, 2008, pp. 136-140.

* cited by examiner

_METHOD AND APPARATUS FOR REDUCING ENERGY CONSUMPTION OF RADIO COMMUNICATIONS IN A WIRELESS SENSOR NETWORK_

The present disclosure relates generally to wireless sensor networks and, more particularly, to a method and apparatus for transmitting and receiving packets in a Wireless Sensor Network (WSN) in an efficient and asynchronous manner.

BACKGROUND

A sensor node of a wireless sensor network may need to run on a given number of batteries for a long period of time, e.g., several years on a pair of batteries. In one example, changing the batteries or recharging the batteries in each sensor node of the wireless sensor network may be infeasible or unpractical because the sensor nodes may be physically inaccessible or deployed in an area that is difficult to access. In another example, the scale of deployment may be very large, thereby making the operation of changing or recharging the batteries costly and labor intensive. Thus, increasing the lifetime of the batteries presents a difficult challenge for a service provider of such wireless sensor networks.

SUMMARY OF THE DISCLOSURE

In one embodiment, the present disclosure describes a method and an apparatus for receiving a data packet that is transmitted from a first sensor node. For example, the method performs a channel scan of a particular burst of channel scans, wherein channel scans are performed in a sequence until either all channel scans of the particular burst of channel scans are performed or a preamble packet from a sequence of preamble packets is detected, wherein the channel scan is performed where a duration of time, ranging from a beginning of the particular burst of preamble scans to an end of the particular burst of preamble scans, is greater than a quiet gap of the first sensor node. The method determines whether the preamble packet is detected, and receives the data packet when the preamble packet is detected, wherein the receiving comprises: determining whether the preamble packet is addressed to the second sensor node, sending an acknowledgement packet to the first sensor node when the preamble packet is addressed to the second sensor node, and receiving the data packet that is transmitted from the first sensor node. the method then sleeps, for a duration of time, when there is no packet transmission that is ongoing that is destined to the second sensor node, wherein the duration of time during which the second sensor node sleeps is less than a duration of time for transmitting the sequence of preamble packets from the first sensor node to the second sensor node.

In one embodiment, the present disclosure describes a method and an apparatus for transmitting a data packet from a first sensor node to a second sensor node are disclosed. The method transmits a sequence of preamble packets to a second sensor node, wherein the transmitting of consecutive preamble packets of the sequence of preamble packets is performed where consecutive preamble packets are separated by a quiet gap, wherein a duration of time ranging, from a beginning of the transmitting of a first preamble packet of the sequence of preamble packets to an end of the transmitting of a last preamble packet of the sequence of preamble packets is greater than a duration of time during which the second sensor node sleeps in between performing consecutive bursts of channel scanning, wherein a duration of time ranging, from a beginning of performing of a burst of channel scans to an end of the performing of the burst of channel scans by the second sensor node is greater than the quiet gap, wherein a duration of time for transmitting a preamble packet of the sequence of preamble packets is greater than a time period during which the second sensor node takes a nap, wherein the time period during which the second sensor node takes a nap is a time period during which the second sensor nodes does not perform channel scanning, wherein the time period during which the sensor node takes a nap is in between consecutive channel scans of the burst of channel scans. The method receives an acknowledgement from the second sensor node, and transmits the data packet to the second sensor node.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly describes a method and apparatus for transmitting and receiving of packets in a Wireless Sensor Network (WSN). Although the teachings of the present disclosure are discussed below in the context of a WSN network, the teaching is not so limited. Namely, the teachings of the present disclosure can be applied to other types of wireless networks that can benefit from the power reduction methods of the present disclosure.

Broadly defined, WSN is a network that comprises one or more sensor nodes or sensor devices (or simply sensors that are hardware devices) that are spatially distributed. For example, the WSN may be used for collecting and distributing data that is obtained by monitoring for physical or environmental conditions, such as temperature, motion, humidity, sound level, pressure, and so on, via the sensors.

In one embodiment, a sensor node may communicate with an end user through a base station that functions as a gateway. In another embodiment, a sensor node may communicate with any other sensor node that is within a pre-determined range in terms of a physical distance. For example, a particular sensor node may communicate with other sensor nodes located within 100m of the particular sensor node.

Figure 1:
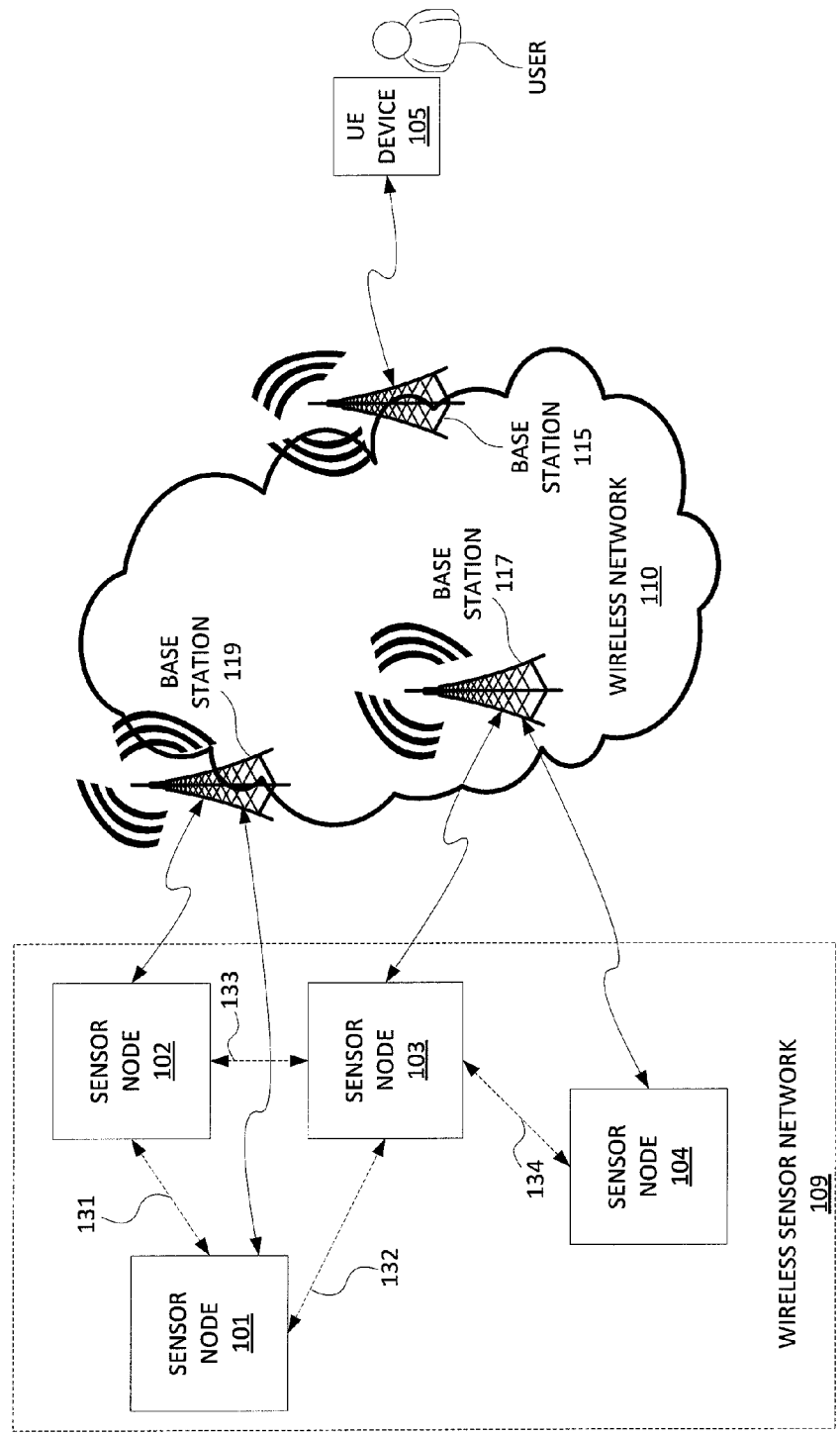
FIG. 1 illustrates an exemplary network related to the current disclosure.

FIG. 1 illustrates an exemplary network 100 related to the current disclosure. The network 100 comprises a wireless sensor network 109, a wireless network 110 of a service provider, and a user endpoint device 105. The wireless sensor network 109 comprises sensor nodes 101-104. The sensor nodes 101-104 are used for collecting and distributing data that is obtained by monitoring one or more physical or environmental conditions in the vicinities of each of the respective sensor nodes.

Each of the sensor nodes 101-104 may have the capability to communicate with any other sensor node that is located within a pre-determined physical distance of the sensor node. For the exemplary network 100, sensor node 101 communicates with sensor nodes 102 and 103, via wireless links 131 and 132, respectively. Similarly, sensor node 102 communicates with sensor nodes 101 and 103, via wireless links 131 and 133, respectively. Sensor node 103 communicates with sensor nodes 101, 102 and 104, via wireless links 132, 133 and 134, respectively. Sensor node 104 communicates with sensor node 103 via the wireless link 134.

In addition, the sensor nodes 101-104 communicate with a user of an endpoint device 105, via a base-station of the service provider network 110. For example, sensor nodes 101-102 may communicate with the user endpoint device 105 via the base station 119. Similarly, sensor nodes 103-104 may communicate with the user endpoint device 105 via the base station 117. In turn, the user endpoint device 105 may communicate with the sensors via the base-station 115. In this example, the base stations 115, 117 and 119 serve as gateways.

In order to gather and disseminate the desired sensory data, the sensor node is designed such that it is capable of: communicating, computing, and performing the sensing functionality for a desired application. For example, a sensor node may comprise: a sensor, a power source, a processor, a memory, and a radio transceiver.

Figure 2:
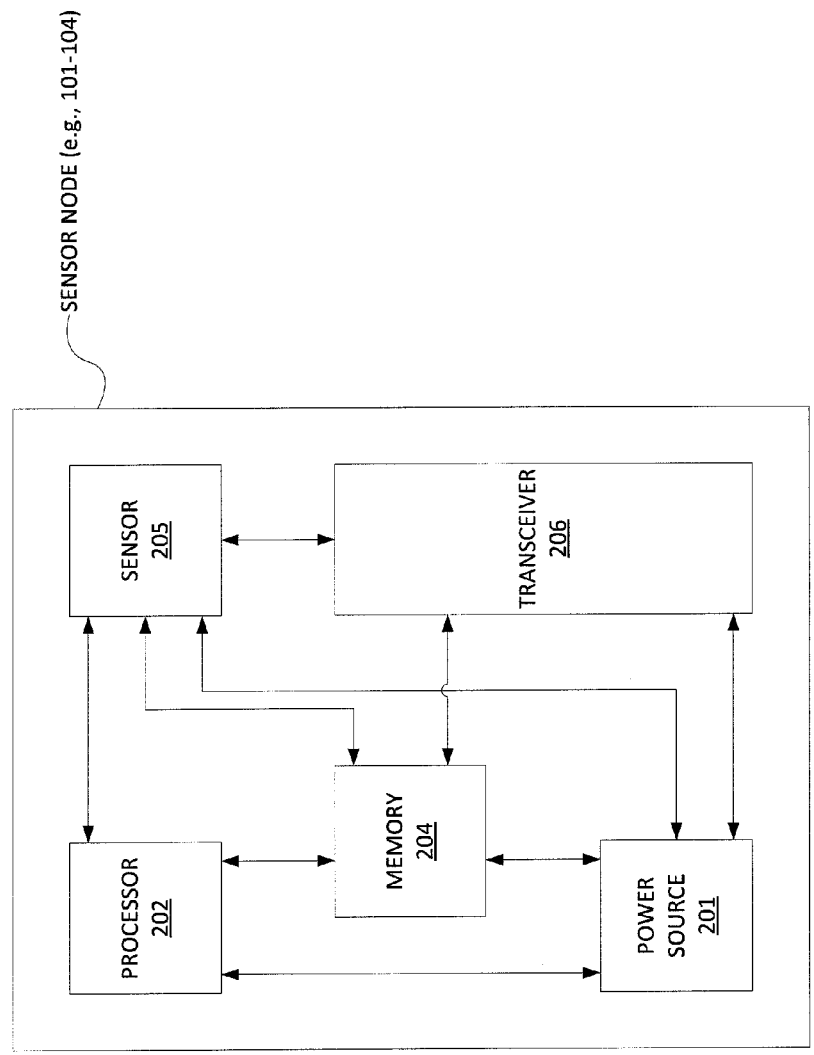
FIG. 2. Illustrates an exemplary sensor node of the present disclosure.

FIG. 2 illustrates an exemplary sensor node 200 of the present disclosure. For the exemplary network of FIG. 1, sensor node 200 may represent any one of the sensor nodes 101 through 104. The sensor node 200 comprises a power source 201, a processor 202, a memory 204, a sensor module 205 for performing a sensing function, and a transceiver 206.

Radio activities are expensive in terms of energy consumption. For example, energy is consumed not only during packet transmission and reception, but also during idle listening. Idle listening refers to a time period in which a radio transceiver of a sensor node is awake and is actively listening to the wireless medium even though no packets are being transmitted to that sensor node. In fact, over a long period of time, idle listening may be the most significant source of energy consumption for a sensor node.

One approach to reduce the energy consumption is to implement duty cycling. Duty cycling refers to a method in which a sensor node performs sampling of the wireless medium by putting the sensor node's radio transceiver in a sleep mode, and waking up the radio transceiver periodically in order to check if there is a radio transmission intended for the sensor node. The transceiver may then spend the majority of its time in the sleep mode, thereby reducing energy consumption. However, duty cycling may cause the wireless communication to become unreliable. For example, if a first sensor node transmits a packet to a second sensor node while the transceiver of the second sensor node is in the sleep mode, the communication fails, i.e., the packet is not received by the second sensor node.

One approach to address the reliability concern may encompass the use of a method that synchronizes wake up times across a plurality of sensor nodes that need to communicate with each other. However, synchronization across the sensor nodes requires exchanging synchronization control packets regularly, even if there are no data packets that need to be transmitted. The exchanging of the synchronization control packets again consumes energy. Consequently, the gain in the reliability is obtained at a cost of increasing the energy consumption.

Another approach to address the reliability concern may be the use of a Low Power Listening (LPL) method. The LPL method can be used by asynchronous protocols, such as Berkeley Media Access Control (B-MAC) protocol. LPL avoids the need for synchronizing wake up times across a plurality of sensor nodes by transmitting a long preamble sequence before each packet transmission. A long preamble sequence refers to a preamble sequence, wherein the duration of the preamble sequence, $T_{preamble}$, is at least as long as the sleep period, $T_{sleep}$, of the sensor node that is receiving the preamble sequence. For example, for B-MAC protocol, $$T_{preamble} > T_{sleep}. \tag{1}$$

Since the preamble sequence is long, when a transceiver of a sensor node wakes up to perform the sampling, the transceiver is guaranteed to detect the preamble. The preamble contains a destination address. If the preamble is detected, the transceiver remains on (staying awake) until the packet is received.

The energy efficiency of LPL is gained by ensuring, for a sensor node, the awake period of time for sampling the wireless medium, $T_{scan}$, is significantly shorter that the sleep period of time, $T_{sleep}$. The awake period of time for sampling of the wireless medium may also be referred to as a channel scan period. Asynchronous protocols that control the duty cycle by controlling how much time of the sum of the awake and sleep times is dedicated for sampling may also be referred to as low-duty-cycle protocols. Duty-cycle refers to a ratio of the awake period of time to a sum of the awake period of time and the sleep period of time.

Unfortunately, the LPL method, described above, has several disadvantages. First, protocols like B-MAC are designed for bit streaming radios which can generate preambles of arbitrary length. However, most modern sensor nodes use packet radio transceivers that are based on, e.g., an IEEE 802.15.4 standard that limits the maximum size of a packet to 128 bytes. The second disadvantage of the B-MAC protocol is that the protocol does not have a mechanism for an acknowledgment. The receiving sensor node has no way of notifying the sending sensor node that the receiving sensor node is awake and is ready to start receiving the data packets. Thus, the wait periods tend to be long and energy is wasted at both the sending and receiving sensor nodes. A third disadvantage is that sensor nodes that are not targeted for receiving a particular packet need to be awake for the entire duration of the preamble sequence to determine that the packet is not intended for them.

Another approach is to use an asynchronous protocol that has a mechanism for an acknowledgement. An example of such protocol is X-MAC, which is used for packet radio transceivers. The LPL schemes designed for packet radio transceivers that comply with the IEEE 802.15.4 standard, do not use preambles that comprise an uninterrupted bit sequence. Instead, they use a series of preamble packets with quiet gaps between successive packets. The preamble of the X-MAC protocol may also be referred to as a packetized preamble.

Let $T_{prepkt}$ represents a duration of each preamble packet, and let $T_{gap}$ represents a duration of a quiet gap of a sending sensor node. The preamble packets contain the address of the destination sensor node. When a receiving sensor node wakes up and detects the preamble addressed to it, the receiving sensor node sends a link-layer acknowledgment packet (ACK) to the sending sensor node during the receiving sensor node's quiet gap. The ACK is sent to the sending sensor node such that the sending sensor node can stop transmitting the preamble and begin transmitting the data packet. The sending sensor node then goes back to sleep after it completes transmitting the data packet. However, X-MAC also has some disadvantages.

First, a receiving sensor node may miss a packet if the entire sequence of preamble packets transmitted by the sending sensor node lies completely within the receiving sensor node's sleep period. Thus, for proper operation of X-MAC, $$T_{preamble} > T_{sleep}. \quad (2)$$

Second, for the communication to succeed, the sensor node that is receiving the packet needs to perform the scanning for a time period longer than the time period of the quiet gap. That is, for X-MAC, $$T_{scan} > T_{gap}. \quad (3)$$

Otherwise, the sampling may occur during a quiet gap and the sensor node that is supposed to receive the packets may fail to receive the packets. Hence, the communication between the sending sensor node and the receiving sensor node may fail.

It is important to note that the quiet gaps cannot be made arbitrarily small just for the purpose of reducing the duration of the channel scan. The quiet gap period is based on various factors. In one example, some hardware and software delays are incurred in transitioning the radio transceiver from a transmit state to a receive state. Then, the radio transceiver of the sending sensor node should wait for at least one ACK period (e.g., 352 microseconds for IEEE 802.15.4 based radios) to see if the receiving sensor node has sent an ACK. Then, the radio transceiver performs a Clear Channel Assessment (CCA) check, to determine if the channel is free. If the channel is not free, then the node has to back-off for some time period and repeat the CCA check. This CCA check is repeated until either, the channel is detected as being free or a threshold is reached for a number of failed attempts of the CCA check. If the channel is free, the radio transceiver transitions from the receive state to the transmit state. This transition incurs additional hardware and software delays. Thus, the size of the quiet gap is nondeterministic and can be quite large, especially in the presence of congestion where a transmitter needs to perform several CCA checks and multiple back-offs. Thus, the awake period of time for sampling, $T_{scan}$, of the X-MAC protocol is significantly higher than that of the B-MAC.

For example, in a default TinyOS implementation of X-MAC, each sensor node samples the channel for about 11 ms. In contrast, for the B-MAC that relies on a long preamble, a receiving sensor node may detect the preamble by scanning for less than 1 ms. The increase in the time periods that the nodes with X-MAC protocol are awake increases the duty cycle and energy consumption, thereby resulting in a higher duty cycle for the X-MAC as compared to that of the B-MAC.

One approach to try to control the length of the awake times is by maintaining some states regarding the awake time instances of neighboring sensor nodes. For example, in a ContikiMAC protocol, after a sending sensor node's transmission is detected by a receiving sensor node, the sending sensor node caches the awake time period of the receiving sensor node. Then, for subsequent transmissions to the same receiving sensor node, the sending sensor node transmits the preamble packets at an expected awake time period of the receiving sensor node. Obviously, state maintenance for all neighboring sensor nodes and time synchronization among all neighboring sensor nodes are major disadvantages of this approach. In addition, scaling up a state based protocol for a large network implementation is also impractical.

All of the approaches, described above, assume an inherent tradeoff among the following goals:

(1) The goal of having short awake periods for each sensor node, such that the duty cycle is reduced.

(2) The goal to maintain or improve the reliability of the wireless communication while reducing the duty cycle.

(3) The goal to support packet radios by using packetized preambles that are compatible with standards, e.g., IEEE 802.15.4, and to reduce the preamble length for unicast transmissions.

(4) The goal to support an asynchronous operation, such that extra energy is not incurred for overhead dedicated for synchronization among sensor nodes in the network.

(5) The goal to operate in a stateless manner, such that the sensor nodes are not required to maintain any state about the wake up times of the neighboring sensor nodes.

For example, B-MAC is asynchronous, stateless, and uses short channel scans, but cannot be used with packet radios. X-MAC is asynchronous, stateless, and compatible with packet radios, but uses long channel scan periods. Contiki-MAC is compatible with packet radio, uses short channel scans, but needs to maintain neighbor states.

In one embodiment, the present disclosure describes a method of performing the duty cycling that meets all of the above goals. The method of the present disclosure may be referred to as "QuickMAC." The method of the present disclosure performs n number of short scans and opportunistically takes naps in between successive scans. As described above, the X-MAC samples a channel for a time period slightly longer than the quiet gap in a preamble, $T_{scan} > T_{gap}$. The term "slightly" is used to refer to a scenario that guarantees that the duration of the channel scan is measurably longer than the quiet gap. In contrast, the QuickMAC of the present disclosure performs n number of short channel scans and opportunistically takes quick naps in between the channel scans. The timing of the n scans is chosen such that a receiver is guaranteed to perform at least one of the n channel scans during the transmission of the preamble packet. The duty cycle of the present method is lower because, even though QuickMAC performs n channel scans as opposed to the one channel scan of the X-MAC, the total awake time for the n channel scans of QuickMAC is significantly smaller than the one channel scan of the X-MAC.

Figure 3:
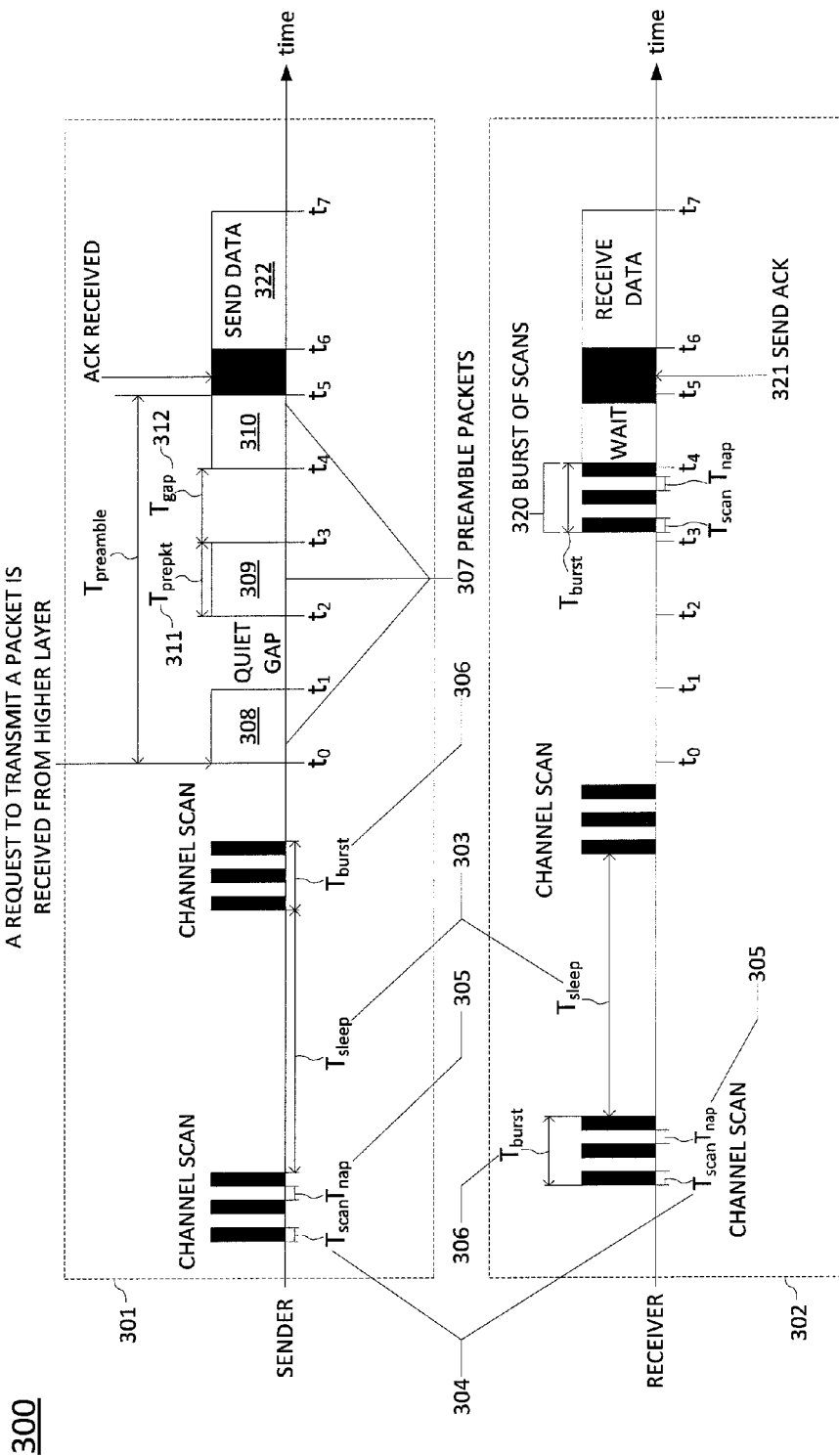
FIG. 3 illustrates a pair of sensor nodes of the present disclosure.

FIG. 3 illustrates the operation or method 300 of a pair of sensor nodes of the present disclosure. The pair of sensor nodes comprises a sensor node 301 that is transmitting packets to a sensor node 302. For this particular communication (transmission) the sensor node 301 may then be referred to as the sending sensor node. Similarly, the sensor node 302 may then be referred to as a receiving sensor node. For example, for the exemplary network of FIG. 1, the pair of sensor nodes may represent any of the pairs of sensor nodes that can communicate with each other. For example, the pair may be the sensor nodes 101 and 102; 101 and 103; 102 and 103; or 103 and 104. For a particular transmission of packets (e.g., data packets), from a first sensor node to a second sensor node, the sensor node that originates the data packets is the sending sensor node and the sensor node that receives the data packets is the receiving sensor node. As such, the sensor nodes of the wireless sensor network may serve as a sending sensor node for one communication, and as a receiving sensor node for another communication.

Each of the sending and the receiving sensor nodes of the wireless sensor network sleeps for a time period of $T_{sleep}$, and wakes up to perform n short channel scans, wherein each channel scan is of length $T_{scan}$. For example, for the sensor nodes of FIG. 3, each of the sensor nodes 301 and 302 sleeps for a period of time shown in 303 and performs three (e.g., n=3) channel scans, each channel scan being of a duration as shown in 304. In between two successive channel scans, the node goes to sleep briefly for a time period of $T_{nap}$, shown as 305. Thus, for the n channel scans, there are (n−1) corresponding periods of length $T_{nap}$, during which the node takes a short nap. The total duration of time for performing the n channel scans and taking the (n−1) naps in between consecutive channel scans may be represented by $T_{burst}$. The duration of $T_{burst}$ is shown in 306. Then, $T_{burst}$ may be represented mathematically as:

$$T_{burst} = nT_{scan}(n-1)T_{nap}. \quad (4)$$

In one embodiment, the preamble packets comprise normal preamble packets. In another embodiment, the preamble packets comprise data packets that are transmitted as preamble packets.

For the receiving operation, when the receiving node decodes the preamble packet, it determines if this transmission is destined to the receiving node. After n channel scans, if there is no packet transmission that is ongoing destined to the receiving node, the receiving node again goes back to sleep for the duration of the $T_{sleep}$.

If there is a packet transmission destined to it, the receiving node remains awake and receives the preamble packet. The receiving node transmits an acknowledgment (ACK) to the sending sensor node when one of the preamble packets is received in its entirety. The sending sensor node then receives the acknowledgment and begins sending the data packets. The receiving node determines if all the data packets are received. When all the data packets are received, the receiving node again goes back to sleep for the duration of the $T_{sleep}$.

As described above, the receiving node may miss the preamble packets unless it is performing a channel scan when at least one of the preamble packets is received during a scanning operation. Thus, for reliable wireless communication, at least one of the scans of the channel needs to overlap with at least one of the preamble packets. The conditions to be satisfied by the receiving sensor node may be represented mathematically as follows:

$$T_{preamble} > T_{sleep}, \quad (5)$$

$$T_{burst} > T_{gap}, \text{ and} \quad (6)$$

$$T_{nap} < T_{prepkt}, \text{ wherein} \quad (7)$$

$$T_{burst} = nT_{scan} + (n-1)T_{nap}. \quad (8)$$

The condition $T_{preamble} > T_{sleep}$ ensures that the preamble sequence transmitted by the transmitter does not lie completely within the sleep period of the receiver. The condition $T_{burst} > T_{gap}$ ensures that the receiver does not perform all n channel scans during the quiet gap of the preamble sequence. Finally, the condition $T_{nap} < T_{prepkt}$ ensures that each nap of the naps taken by the receiver in between two channel scans is short enough so that a preamble packet that is transmitted by the transmitter does not lie completely within a nap period. These three conditions ensure that at least one channel scan overlaps with at least one preamble packet transmission, enabling the receiver to detect the packet transmission destined to it.

Returning to FIG. 3, for the sending operation, the sending sensor node 301 transmits a series of preamble packets 307. The series of preamble packets 307 comprises the preamble packets 308-310. Each packet of the series of preamble packets comprises a packet of duration $T_{prepkt}$. The duration of a preamble packet is illustrated in 311. In between two successive preamble packets of the series of preamble packets, there is a quiet gap of duration $T_{gap}$, shown in 312. Hence, there is one quiet gap between preamble packets 308 and 309, and a second quiet gap between preamble packets 309 and 310.

The sending sensor node 301 receives a request to transmit a packet at time $t_0$, and transmits the preamble packet 308. The receiving sensor node is sleeping during the time period the preamble packet 308 is sent. Thus, the preamble packet 308 is not received by the sensor node 302. Sensor node 301 waits for the duration of the quiet gap between times $t_1$ and $t_2$ and then transmits the preamble packet 309. Again, the sensor node 302 fails to receive the preamble packet 309, because between times $t_2$ and $t_3$, the sensor node 302 is still asleep. Sensor node 301 waits for the duration of the quiet gap between times $t_3$ and $t_4$ and then transmits the preamble packet 310. At time $t_4$, sensor node 302 is performing a third channel scan of a burst of scans 320, thereby detecting the preamble packet 310. The sensor node 302 stays awake until $t_5$ to finish receiving the preamble packet 310. When the preamble packet is received in its entirety, the sensor node 302 determines if the preamble packet is addressed to it. Upon confirmation that the preamble packet 310 is addressed to the sensor node 302, the sensor node 302 sends an acknowledgment packet 321 to sensor node 301. The sensor node 301 receives the acknowledgment packet 321 and transmits (sends) the one or more data packets (broadly referred to as data) 322 in the time period between $t_6$ and $t_7$. Then, the sensor node 302 receives the data packets 322.

It is important to note that $T_{gap}$ is nondeterministic and can be large in the presence of congestion. Thus, $T_{burst}$ is not arbitrarily selected. For example, in a congested network, $T_{gap}$ may be large, e.g., larger than 11 ms. In such situation, a receiver may not be able to receive some of the packet transmissions destined to it, unless the value of $T_{burst}$ is selected carefully, such that $T_{burst}$ is greater than the applicable value of $T_{gap}$ for the congested network.

In an embodiment of the present disclosure, $T_{gap}$ is less than 11 ms. Thus, $T_{burst}$ is chosen to be slightly longer than 11 ms. Setting the value of $T_{burst}$ to 11 ms ensures that the packet reception performance of the present disclosure is at least as good as that of the default X-MAC implementation in TinyOS, as described above.

Returning to the conditions above, in order to satisfy the inequality provided in equation (7), the method uses knowledge of the value of $T_{prepkt}$ to set the value of $T_{nap}$. In the original version of X-MAC, the preamble packets are of fixed size. Thus, $T_{prepkt}$ is fixed and $T_{nap}$ can be chosen accordingly. However, in TinyOS implementation of X-MAC, data packets are themselves transmitted as preamble packets. Since the size of the data packet, i.e., $T_{prepkt}$, is application dependent, choosing $T_{nap}$ is also not trivial. One approach is to choose a value for $T_{nap}$ such that the chosen value is smaller than the smallest possible value of $T_{prepkt}$. For example, the value of $T_{nap}$ may be chosen to be the same as the transmission time of a packet with no application payload and with only minimum network headers. However, choosing such a small value for $T_{nap}$ implies that a sensor node needs to choose a large value for the number of channel scans, n, in order to satisfy the inequality $T_{burst} > T_{gap}$, provided in (6). The small value of $T_{nap}$ and the corresponding large value of n reduce the time period for which a radio transceiver sleeps, thereby increasing the duty cycle.

In order to achieve a low duty cycle, in one embodiment, the present method sets each preamble packet to be 128 bytes long. For example, at the sending sensor node, the application payload and the corresponding network stack headers may be padded with a required number of padding bytes (don't care bytes) such that the total packet size is 128 bytes long. At the receiving sensor node, when a packet is received, the sensor node removes the padding bytes and gives the remaining content to the higher layer. The remaining content comprises the application payload and the corresponding network stack headers. The preamble packet length of 128 bytes corresponds to a particular value of $T_{prepkt}$. This particular value of $T_{prepkt}$ is approximately 4 ms. Then, the method chooses a value for $T_{nap}$, such that $T_{nap}<T_{prepkt}$. For example, $T_{nap}$ may be chosen to be less than 4 ms.

It is important to note that the 128 bytes length is chosen for this embodiment because the 128 bytes is the maximum preamble length allowed by current IEEE 802.15.4 standards. However, the method of the present disclosure may be implemented based on a maximum size of any other protocol.

For example, if n=4, $T_{nap}$=3.6 ms and $T_{scan}$=0.708 ms, then $T_{burst}$=13.6 ms. This value of $T_{burst}$ is larger than the channel scan period used by X-MAC, which is 11 ms. As such, the wireless communications in accordance with the method of the present disclosure yield as good or better reliability as compared to the other methods as discussed above. In addition, since the receiving sensor node of the present method takes naps in between the short scans, the method reduces the duty cycle. The portion of time during which the sensor takes naps may be calculated as: $(n-1)T_{nap}$ ms. The portion of time during which the sensor takes the n scans may be calculated as: $nT_{scan}$. For the example above, n=4 and $T_{nap}$=3.6 ms, then during the $T_{burst}$ of 13.6 ms, the sensor node sleeps for 10.8 ms and remains awake for 2.8 ms. Recalling that in X-MAC, the sensor node remains awake for the entire 11 ms, the method of the present disclosure significantly reduces the duty cycle.

In another embodiment, the service provider may wish to further reduce the duty cycle by choosing a number of scans lower than 4. For example, if n=3, $T_{nap}$=3.6 ms and $T_{scan}$=0.708 ms, then $T_{burst}$=9.324 ms. The sensor node remains awake for 2.124 ms of the 9.324 ms, and sleeps for 7.2 ms of the 9.3 ms. Since the value of $T_{burst}$ is less than the 11 ms channel scan period of the X-MAC protocol, the reliability of the packet reception, when the value of n is selected to be equal to three, is less than that of the X-MAC protocol. The service provider may then select the value of n by weighing a desired reliability of the packet against a desired low value of a duty cycle.

In one example, the service provider may wish to further reduce the duty cycle by choosing the number of scans n to be equal to two. For example, the method may perform two channel scans separated by O.5 ms. If the quiet gaps are larger than 0.5 ms, the two channel scans may lie completely within a quiet gap. If only 2 channels scans are used, there is even greater probability that the channel scans would lie completely within a quiet gap. One approach to address this problem is having a sending sensor node cache the awake times of the receiving sensor node, as performed in the case of the ContikiMAC protocol described above. However, one of the goals of the present disclosure is performing the communication in a completely stateless and asynchronous manner.

Thus, in one embodiment of the present disclosure, the method sets the value of n to four (4), such that the duty cycle of the present method is significantly lower than that of the X-MAC protocol, while the reliability of the present method is better than that of the X-MAC protocol. In addition, the communication is performed in a stateless and asynchronous manner. The goal of supporting packet radios by using packetized preambles that are compatible with standards, e.g., IEEE 802.15.4, is also met.

It is important to note that, although each preamble packet of the present method may be longer than the preamble packet of the X-MAC protocol, the length of the entire preamble sequence is the same for both the present protocol and the X-MAC protocol. As such, the time period for which a node turns its radio transceiver on while transmitting a packet is the same in both protocols. In addition, for modern radio transceivers, the energies for receiving and transmitting are almost the same. As such, having a larger preamble packet does not increase the transmission energy cost of the present method. The present method may reduce energy consumption by a significant amount, e.g., by a factor of four.

Figure 4:
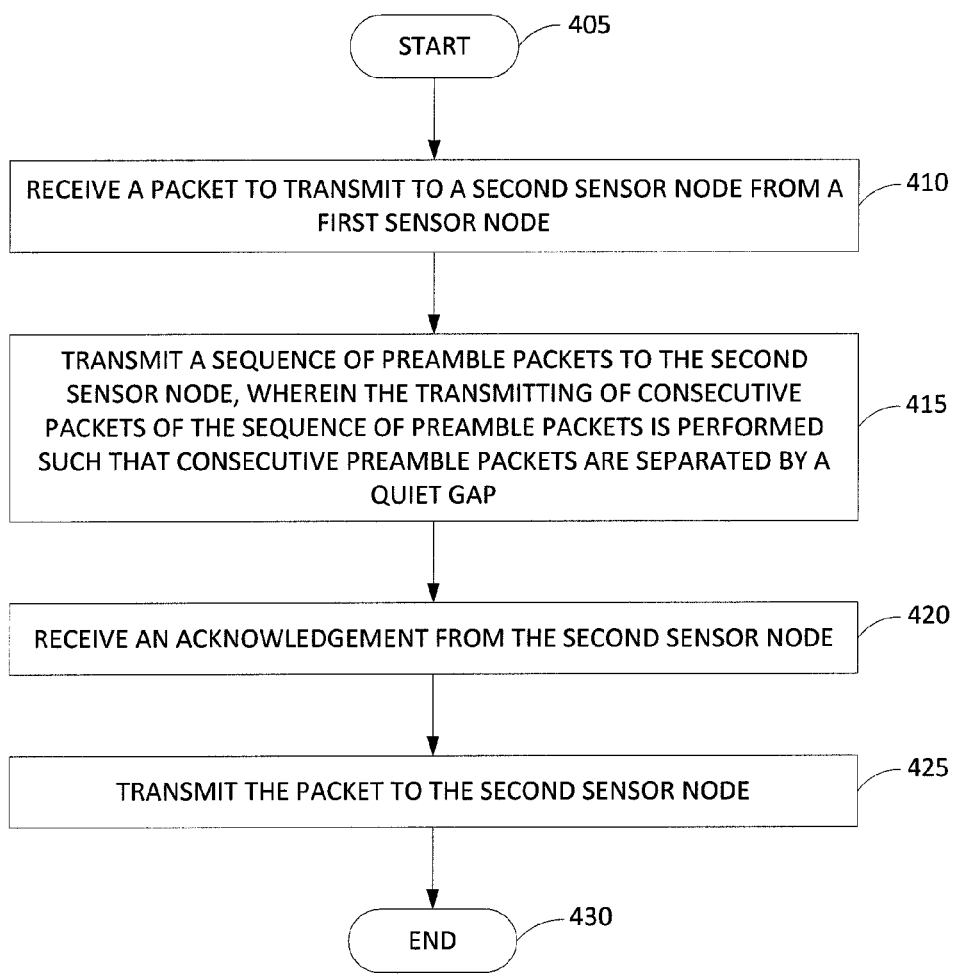
FIG. 4 illustrates a flowchart of a method for transmitting a packet from a first sensor node to a second sensor node.

FIG. 4 illustrates a flowchart of a method 400 for transmitting a packet from a first sensor node to a second sensor node. For example, the method may be implemented in a sensor node 200 of a wireless sensor network or a general purpose computer illustrated in FIG. 6 below. Method 400 starts in step 405 and proceeds to step 410.

In step 410, method 400 receives a packet, e.g., a data packet, a voice packet, etc., to transmit to the second sensor node. For example, the first sensor node may receive the packet from a higher layer protocol. The packets received from the higher layer protocol comprise the payload (content packets) to be transmitted. Alternatively, the data packet can be generated locally, e.g., by a sensor node monitoring for a particular condition. In other words, the data packet sent by the first sensor node to the second sensor node can be received by the first sensor node to be forwarded or generated locally by the first sensor node itself.

In step 415, method 400 transmits a sequence of preamble packets to the second sensor node, wherein the transmitting of the consecutive packets of the sequence of preamble packets is performed such that the consecutive preamble packets are separated by a quiet gap of the first sensor node. The transmitting of the sequence of preamble packets is performed such that the conditions 1-3 below are satisfied.

Condition 1: A duration of time ranging, from a beginning of the transmitting of a first preamble packet of the sequence of preamble packets to a finishing of the transmitting of a last preamble packet of the sequence of preamble packets, is greater than a duration of time during which the second sensor node sleeps in between performing consecutive bursts of scanning.

For example, if the sequence of preamble packets comprises m preamble packets, then each of the m preamble packets is followed by a quiet gap. Thus, there will be (m−1) quiet gaps separating the m preamble packets of the sequence of preamble packets. The total duration of time, for the (m−1) quiet gaps and for transmitting the m preamble packets, is greater than the sleep period of the sensor node to which the preamble packets are transmitted (the second sensor node). For example, for the example of FIG. 3, $T_{preamble}>T_{sleep}$. The condition $T_{preamble}>T_{sleep}$ ensures that the sequence of preamble packets transmitted by the first sensor node does not lie completely within the sleep period of the second sensor node.

Condition 2: A duration of time ranging, from a beginning of performing of a burst of scans to the end of the performing of the burst of scans by the second sensor node is greater than a quiet gap of the first sensor node.

For example, the second sensor node may sleep for a time period of $T_{sleep}$, and wake up to perform the burst of scans. For example, the burst of scans may comprise n short channel scans, wherein each channel scan is of length $T_{scan}$. In between any two successive channel scans of the n channel scans within a particular burst of scans, the second sensor node goes to sleep briefly (i.e., naps) for a time period of $T_{nap}$. Thus, for the n channel scans within the particular burst of scan, there are (n−1) corresponding time periods of length $T_{nap}$, during which the second sensor node takes a nap. The total duration of time for performing the n channel scans and taking the (n−1) naps may then be represented by a time period of a burst of scans, $T_{burst}$. Then, $T_{burst}=nT_{scan}+(n-1)T_{nap}$. Then, the condition, to be satisfied becomes $T_{burst}>T_{gap}$, wherein $T_{gap}$ represents a duration of a quiet gap between transmissions of consecutive preamble packets of a particular sequence of preamble packets. The condition $T_{burst}>T_{gap}$ ensures that the second sensor node does not perform all n channel scans of the particular burst of channel scans during a quiet gap between transmissions of consecutive preamble packets of the particular sequence of preamble packets.

Condition 3: A duration of time for transmitting a preamble packet of the sequence of preamble packets is greater than a time period during which the second sensor node takes a nap, wherein the time period during which the second sensor node takes a nap is a time period during which the second sensor nodes does not perform scanning, wherein the time period during which the sensor node takes a nap is between consecutive channel scans of the burst of scan.

For example, in the example of FIG. 3, $T_{nap}<T_{prepkt}$. The condition $T_{nap}<T_{prepkt}$ ensures that each nap taken by the second sensor node (the receiver) in between two channel scans is short enough, such that a preamble packet that is transmitted by the first sensor node (the transmitter) does not lie completely within a nap period of the second sensor node.

In step 420, method 400 receives an acknowledgement from the second sensor node. The second sensor node is the sensor node to which the sequence of preamble packets is intended. The acknowledgement indicates that at least one preamble packet of the sequence of preamble packets that were transmitted is successfully received by the second sensor node. For example, upon receiving at least one of the preamble packets, the second sensor node sends an acknowledgement packet to the first sensor node.

In step 425, method 400 transmits one or more data packets to the second sensor node. For example, the first sensor node transmits the data packets that were received in step 410, to the second sensor node. The method then either proceeds to step 410, to continue receiving packets, or to step 430 to end the process.

Figure 5:
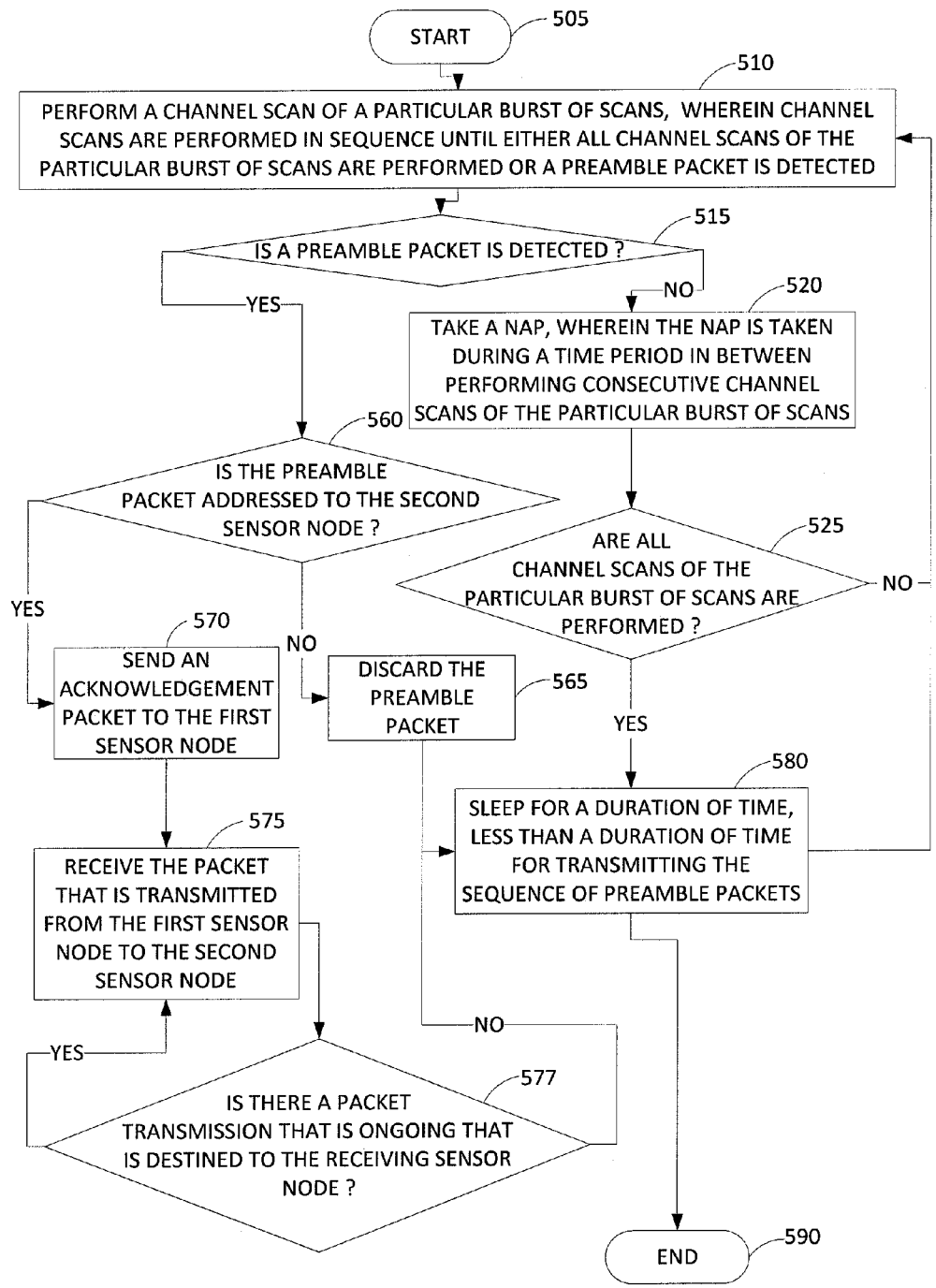
FIG. 5 illustrates a flowchart of a method for receiving a packet that is transmitted from a first sensor node to a second sensor node.

FIG. 5 illustrates a flowchart of a method 500 for receiving a packet that is transmitted from a first sensor node to a second sensor node. For example, the method may be implemented in a sensor node 200 of a wireless sensor network or a general purpose computer illustrated in FIG. 6 below. Method 500 starts in step 505 and proceeds to step 510.

In step 510, method 500 performs a channel scan via a particular burst of channel scans, wherein the channel scans are performed in sequence until either all channel scans of the particular burst of scans are performed or a preamble packet is detected via one of the channel scans. The channel scan is performed such that a duration of time ranging, from a beginning of the particular burst of scans to an end of the particular burst of scans by the second sensor node is greater than a quiet gap of the first sensor node.

In step 515, method 500 determines if a preamble packet is detected. If a preamble packet is detected, the method proceeds to step 560. Otherwise, the method proceeds to step 520.

In step 520, method 500 takes a nap, wherein a duration of the nap is shorter than a duration of time for transmitting a preamble packet of a sequence of preamble packets from the first sensor node to the second sensor node, wherein the nap is taken during a time period in between performing consecutive channel scans of the particular burst of scans.

In step 525, method 500 determines if all channel scans of the particular burst of channel scans are performed. If all channels scans of the particular burst of channel scans are performed, the method proceeds to step 580. Otherwise, the method proceeds to step 510 to perform a next channel scan of the particular burst of channel scans.

For example, the second sensor node (described above) may wake up and begin performing a burst of channel scans. For instance, if the number of channel scans within the particular burst of channel scans is represented by n, wherein n=4, the method performs: the first channel scan; if no preamble packet is detected, takes a first nap; performs a second channel scan; if no preamble packet is detected, takes a second nap; performs a third channel scan; if no preamble packet is detected, takes a third nap; and performs a fourth channel scan. Thus, unless the second sensor node detects a preamble packet during one of the channel scans, the method takes a nap and does another channel scan until all four channel scans of a particular burst are performed.

In step 560, method 500 determines if the preamble packet is addressed to the second sensor node. If the preamble packet is addressed to the second sensor node, the method proceeds to step 570. Otherwise, the method proceeds to step 565.

In step 565, method 500 discards the preamble packet. The method then proceeds to step 580.

In step 570, method 500 sends an acknowledgement packet to the first sensor node. For example, the method may send an ACK packet as a reply to the first sensor node.

In step 575, method 500 receives one or more data packets that are transmitted from the first sensor node to the second sensor node. For example, the method receives the one or more data packets.

In step 577, method 500 determines if there is a packet transmission that is ongoing that is destined to the receiving sensor node. If there is a packet transmission that is ongoing that is destined to the receiving sensor node, the method returns to step 575. Otherwise, the method proceeds to step 580 to sleep.

In step 580, method 500 sleeps (or enters into a sleep mode) for a duration of time, wherein the duration of time the second sensor node sleeps is less than a duration of time for transmitting the sequence of preamble packets from the first sensor node to the second sensor node. The method then proceeds either to step 510 or to step 590, to end the process. For example, $T_{sleep}$ is less than the length of time from a beginning of a transmission of a first preamble packet of a particular sequence of preamble packets to an end of the transmission of the last preamble packet of the particular sequence of preamble packets.

In one embodiment, the preamble packet comprises a normal preamble packet. In one embodiment, the preamble packet comprises a data packet that is transmitted as a preamble packet.

In one embodiment, the quiet gap is less than 11 ms. In one embodiment, the duration of time ranging, from the beginning of the performing of the burst of scan to the end of the performing of the burst of channel scans by the second sensor node, is slightly longer than 11 ms. The term "slightly" is used to refer to a scenario that guarantees that the duration of the channel scan is measurably longer than the quiet gap, e.g., 11.2 ms, 12 ms, etc. In one embodiment, each preamble packet of the sequence of preamble packets is 128 bytes long.

In one embodiment, a number of channel scans that is performed within a particular burst of channel scans is selected by the service provider. In one embodiment, the number of channel scans that is performed within the particular burst of channel scans is selected as being equal to four channel scans. In one embodiment, the number of channel scans that is performed within the particular burst of scan is selected by weighing a desired reliability of a packet transmission against a desired value of a duty cycle.

Figure 6:
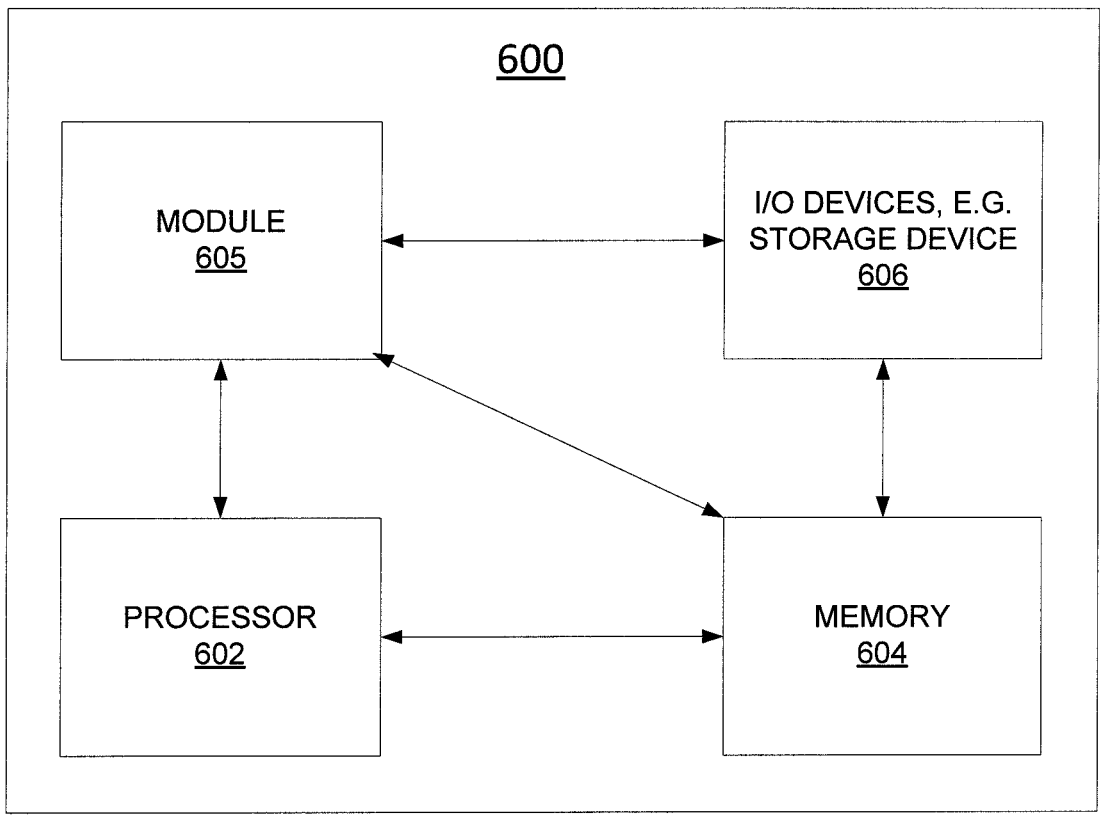
FIG. 6 depicts a high-level block diagram of a general-purpose computer suitable for use in performing the functions described herein.

FIG. 6 depicts a high-level block diagram of a general-purpose computer suitable for use in performing the functions described herein. As depicted in FIG. 6, the system 600 comprises a hardware processor element 602 (e.g., a CPU), a memory 604, e.g., random access memory (RAM) and/or read only memory (ROM), a module 605 for transmitting and/or receiving of packets in a wireless sensor network, and various input/output devices 606 (e.g., storage devices, including but not limited to, a tape drive, a floppy drive, a hard disk drive, a compact disk, a driveflash storage, a receiver, a transmitter, a speaker, a display, a speech synthesizer, an output port, and a user input device (such as a keyboard, a keypad, a mouse, and the like)).

It should be noted that the teachings of the present disclosure can be implemented in software and hardware, e.g., using application specific integrated circuits (ASIC), a general purpose computer or any other hardware equivalents, e.g., computer readable instructions pertaining to the method discussed above can be used to configure a hardware processor (e.g., resulting in a programmed processor) to perform the steps or functions of the above disclosed methods. For example, a non-transitory computer-readable medium may be in communication with the processor, where the non-transitory computer-readable medium having stored thereon a plurality of instructions, the plurality of instructions including instructions which, when executed by the hardware processor, cause the hardware processor to perform operations (e.g., operations of a method 400 or 500) as disclosed above. In one embodiment the present module or process 605 for transmitting and receiving of packets in a wireless sensor network can be loaded into memory 604 and executed by processor 602 to implement the functions as discussed above. As such, the present method for providing transmitting and receiving of packets in a wireless sensor network (including associated data structures) of the present disclosure can be stored on a non-transitory (e.g., tangible or physical) computer readable medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for receiving a data packet that is transmitted from a first sensor node, the method comprising:
performing, by a processor of a second sensor node, a channel scan of a particular burst of channel scans, wherein channel scans are performed in a sequence until either all channel scans of the particular burst of channel scans are performed or a preamble packet from a sequence of preamble packets is detected, wherein the channel scan is performed where a duration of time, ranging from a beginning of a particular burst of preamble scans to an end of the particular burst of preamble scans, is greater than a quiet gap of the first sensor node;
determining, by the processor, whether the preamble packet is detected;
taking a nap, by the processor, when the preamble packet is not detected, and performing, by the processor, a next channel scan of the particular burst of channel scans until all channel scans of the particular burst of channel scans are performed, wherein a duration of the nap is shorter than a duration of time for transmitting a preamble packet of the sequence of preamble packets from the first sensor node to the second sensor node, wherein the nap is taken during a time period in between performing consecutive channel scans of the particular burst of channel scans;
receiving, by the processor, the data packet when the preamble packet is detected, wherein the receiving comprises:
determining whether the preamble packet is addressed to the second sensor node;
sending an acknowledgement packet to the first sensor node when the preamble packet is addressed to the second sensor node; and
receiving the data packet that is transmitted from the first sensor node; and
sleeping, by the processor, for a duration of time, when there is no packet transmission that is ongoing that is destined to the second sensor node, wherein the duration of time during which the second sensor node sleeps is less than a duration of time for transmitting the sequence of preamble packets from the first sensor node to the second sensor node.

2. The method of claim 1, wherein the preamble packet of the sequence of preamble packets comprises the data packet.

3. The method of claim 1, wherein the quiet gap of the first sensor node is less than 11 ms.

4. The method of claim 1, wherein the duration of time ranging, from the beginning of the particular burst of channel scans to the end of the particular burst of channel scans is slightly longer than 11 ms.

5. The method of claim 1, wherein each preamble packet of the sequence of preamble packets comprises 128 bytes.

6. The method of claim 1, wherein a number of channel scans that is performed within the particular burst of channel scans is selected by a service provider.

7. The method of claim 6, wherein the number of channel scans that is performed within the particular burst of channel scans is selected to be equal to four channel scans.

8. The method of claim 6, wherein the number of channel scans that is performed within the particular burst of channel scans is selected by weighing a desired reliability of a transmission of the data packet against a desired value of a duty cycle.

9. A non-transitory computer-readable medium storing a plurality of instructions which, when executed by a processor of a second sensor node, cause the processor to perform operations for receiving a data packet that is transmitted from a first sensor node, the operations comprising:
performing a channel scan of a particular burst of channel scans, wherein channel scans are performed in a sequence until either all channel scans of the particular burst of channel scans are performed or a preamble packet from a sequence of preamble packets is detected, wherein the channel scan is performed where a duration of time, ranging from a beginning of a particular burst of preamble scans to an end of the particular burst of preamble scans, is greater than a quiet gap of the first sensor node;
determining whether the preamble packet is detected;
taking a nap when the preamble packet is not detected and performing a next channel scan of the particular burst of channel scans until all channel scans of the particular burst of channel scans are performed, wherein a duration of the nap is shorter than a duration of time for transmitting a preamble packet of the sequence of preamble packets from the first sensor node to the second sensor node, wherein the nap is taken during a time period in between performing consecutive channel scans of the particular burst of channel scans;

receiving the data packet when the preamble packet is detected, wherein the receiving comprises:
determining whether the preamble packet is addressed to the second sensor node;
sending an acknowledgement packet to the first sensor node when the preamble packet is addressed to the second sensor node; and
receiving the data packet that is transmitted from the first sensor node; and sleeping, for a duration of time, when there is no packet transmission that is ongoing that is destined to the second sensor node, wherein the duration of time during which the second sensor node sleeps is less than a duration of time for transmitting the sequence of preamble packets from the first sensor node to the second sensor node.

10. The non-transitory computer-readable medium of claim 9, wherein the preamble packet of the sequence of preamble packets comprises the data packet.

11. The non-transitory computer-readable medium of claim 9, wherein the quiet gap of the first sensor node is less than 11 ms.

12. The non-transitory computer-readable medium of claim 9, wherein the duration of time ranging, from the beginning of the particular burst of channel scans to the end of the particular burst of channel scans is slightly longer than 11 ms.

13. A method for transmitting a data packet, the method comprising:
transmitting, via a processor of a first sensor node, a sequence of preamble packets to a second sensor node, wherein the transmitting of consecutive preamble packets of the sequence of preamble packets is performed where consecutive preamble packets are separated by a quiet gap,
wherein a duration of time ranging, from a beginning of the transmitting of a first preamble packet of the sequence of preamble packets to an end of the transmitting of a last preamble packet of the sequence of preamble packets is greater that a duration of time during which the second sensor node sleeps in between performing consecutive bursts of channel scanning,
wherein a duration of time ranging, from a beginning of performing of a burst of channel scans to an end of the performing of the burst of channel scans by the second sensor node is greater than the quiet gap,
wherein a duration of time for transmitting a preamble packet of the sequence of preamble packets is greater than a time period during which the second sensor node takes a nap, wherein the time period during which the second sensor node takes the nap is a time period during which the second sensor nodes does not perform channel scanning, wherein the time period during which the sensor node takes the nap is in between consecutive channel scans of the burst of channel scans;
receiving, via the processor, an acknowledgement from the second sensor node; and
transmitting, via the processor, the data packet to the second sensor node.

14. The method of claim 13, wherein the preamble packet of the sequence of preamble packets comprises the data packet.

15. The method of claim 13, wherein the quiet gap is less than 11 ms.

16. The method of claim 13, wherein the duration of time ranging, from the beginning of performing of the burst of channel scans to the end of the performing of the burst of channel scans by the second sensor node is slightly longer than 11 ms.

17. The method of claim 13, wherein each preamble packet of the sequence of preamble packets comprises 128 bytes.

18. The method of claim 13, wherein a number of channel scans that is performed within the burst of channel scans is selected by a service provider.

19. The method of claim 18, wherein the number of channel scans that is performed within the burst of channel scans is selected to be equal to four channel scans.

20. The method of claim 18, wherein the number of channel scans that is performed within the burst of channel scans is selected by weighing a desired reliability of a transmission of the data packet against a desired value of a duty cycle.

* * * * *